UNITED STATES PATENT OFFICE.

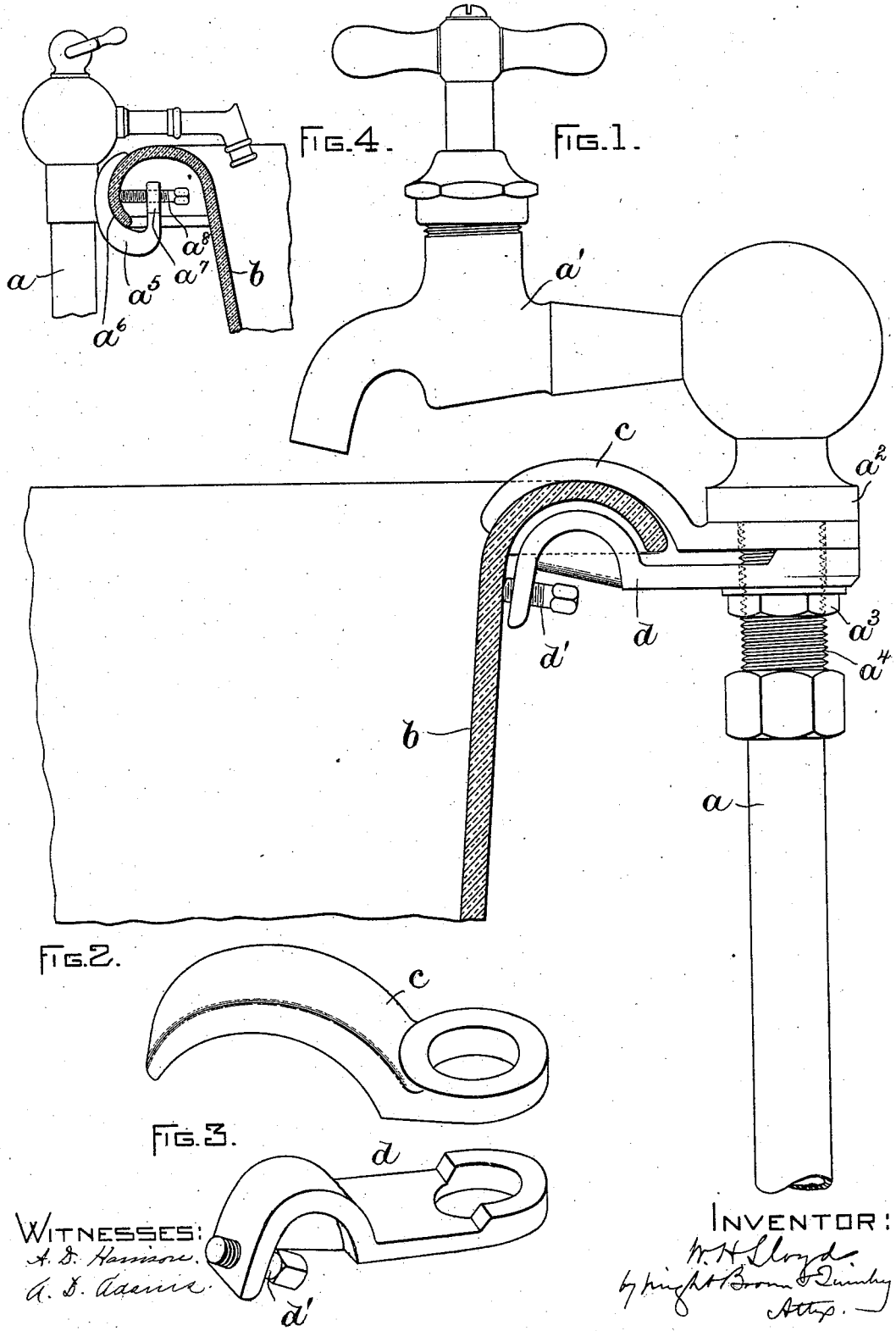

WILLIAM H. LLOYD, OF BOSTON, MASSACHUSETTS, ASSIGNOR TO THE SMITH & ANTHONY COMPANY, OF SAME PLACE.

BATH-TUB SUPPLY-PIPE.

SPECIFICATION forming part of Letters Patent No. 577,264, dated February 16, 1897.

Application filed January 9, 1896. Serial No. 574,827. (No model.)

*To all whom it may concern:*

Be it known that I, WILLIAM H. LLOYD, of Boston, in the county of Suffolk and State of Massachusetts, have invented certain new and useful Improvements in Bath-Tub Supply-Pipes, of which the following is a specification.

This invention has for its object to provide improved means for connecting a water-supply pipe to a bath-tub having a rolled edge; and the invention consists in a supply-pipe provided with clamping members adapted to grasp the rolled edge of a bath-tub, one of said members being concave and formed to fit the convex side of said edge, while the other member is adapted to engage the opposite surface of the tub.

Of the accompanying drawings, forming a part of this specification, Figure 1 represents a side elevation of a water-supply pipe or conduit provided with my improvement, the tub being shown in section. Figs. 2 and 3 represent perspective views of the members of the clamp shown in Fig. 1. Fig. 4 represents a view of a modification.

The same letters of reference indicate the same parts in all the figures.

Referring to Figs. 1, 2, and 3, $a$ represents a water-supply pipe having at its upper end a faucet $a'$, arranged to discharge water into a bath-tub $b$. $c$ represents a concave clamping arm or member secured to the pipe $a$ and formed to bear upon the outer surface of the rolled edge of the tub $b$. With the member $c$ coöperates an adjustable clamping member comprising an arm $d$, also secured to the pipe $a$, and a bearing-screw $d'$, which is adjustable in the outer portion of the arm $d$ and bears against the outer surface of the tub, as shown in Fig. 1. The arms $c$ and $d$ are preferably secured to the pipe $a$ by being clamped between a shoulder $a^2$ on said pipe and a clamping-nut $a^3$, which is adjustable on a threaded portion $a^4$ of said pipe and presses the arm $d$ upwardly against the arm $c$, said arms having orifices, as shown in Figs. 2 and 3, through which the threaded portion of the pipe passes.

It will be seen that by turning the screw $d'$ in one direction the clamping members are caused to grasp and firmly hold the edge of the tub, while by turning said screw in the opposite direction the arms may be released and readily removed from the tub. The curved form of the arm or member $c$ enables it to bear firmly upon the exposed surface of the rolled edge without liability of injuring or defacing the enamel coating thereon.

In Fig. 4 I show a modification in which the pipe $a$ is provided with an arm $a^5$, having a concave seat $a^6$, formed to bear on the outer portion of the rolled edge of the tub $b$, and an extension $a^7$, with which is engaged an adjustable bearing or clamping screw $a^8$, the latter being arranged to bear against the rolled edge at a point opposite the seat $a^6$. The arm $a^5$ therefore constitutes one member and the screw $a^8$ the other member of the clamp.

I claim—

1. A water-supply pipe or fixture having a faucet or outlet at its upper portion, a curved clamping member below said outlet formed to bear on the outer surface of the roll of a bath-tub, and a clamping member formed or arranged to enter the recess of said roll and bear against its wall and adjustably connected with said curved member.

2. A water-supply pipe or fixture having a faucet or outlet at its upper portion, a curved clamping member below said outlet formed to bear on the outer surface of the roll of a bath-tub, and a similarly-curved clamping member formed to take into the recess of said roll and adjustably connected with the first-named clamping member.

3. A water-supply pipe or fixture having a faucet or outlet at its upper portion, a curved clamping member below said outlet formed to bear on the outer surface of the roll of a bath-tub, a similarly-curved clamping member formed to take into the recess of said roll and adjustably connected with the first-named clamping member, and a bearing-screw entered through said adjustable clamping member to bear against the side of the tub.

4. A water-supply pipe or fixture having a faucet or outlet at its upper portion, a shoulder below said outlet, a threaded portion below said shoulder, two clamping members movable on said threaded portion and formed to grasp the edge of a bath-tub, and a clamping-nut engaged with said threaded portion to hold the clamping members in place.

5. A water-supply pipe or fixture having a faucet or outlet at its upper portion, a shoulder below said outlet, a threaded portion below said shoulder, an arm $c$ having a concave portion formed to bear on the upper surface of the roll of a bath-tub, an arm $d$ below the arm $c$ and having a bearing-screw $d'$, said arms being movable on the threaded portion of the pipe, and a nut engaged with said threaded portion and coöperating with the shoulder in confining said arms.

In testimony whereof I have signed my name to this specification, in the presence of two subscribing witnesses, this 19th day of December, A. D. 1895.

WM. H. LLOYD.

Witnesses:
   A. D. HARRISON,
   A. D. ADAMS.